United States Patent [19]

Pratt

[11] Patent Number: 4,848,886

[45] Date of Patent: * Jul. 18, 1989

[54] SUBMARINE PERISCOPE SYSTEMS

[75] Inventor: Stanley J. Pratt, Bishopbriggs, Scotland

[73] Assignee: Barr & Stroud Limited, Glasgow, Scotland

[*] Notice: The portion of the term of this patent subsequent to Sep. 20, 2005 has been disclaimed.

[21] Appl. No.: 118,612

[22] Filed: Nov. 9, 1987

[30] Foreign Application Priority Data

Nov. 18, 1986 [GB] United Kingdom ............... 8627560

[51] Int. Cl.$^4$ ......................... G02B 23/22; B63G 8/00
[52] U.S. Cl. ................................... 350/544; 114/340; 350/319; 350/583
[58] Field of Search ............... 114/340; 350/540, 541, 350/542, 543, 544, 319, 589, 612, 618, 602, 583; 358/99, 88, 108; 356/149

[56] References Cited

U.S. PATENT DOCUMENTS

| | | | |
|---|---|---|---|
| 4,150,875 | 4/1979 | Stachiw et al. | 114/340 |
| 4,213,029 | 7/1980 | Endicott, Jr. et al. | 114/340 |
| 4,284,326 | 8/1981 | Durrer et al. | 350/543 |
| 4,355,867 | 10/1982 | Stachiw | 350/319 |
| 4,436,051 | 3/1984 | Nollez et al. | 114/340 |
| 4,447,129 | 5/1984 | Barthelat et al. | 350/612 |

FOREIGN PATENT DOCUMENTS 2012217 7/1979 United Kingdom ............... 114/340

Primary Examiner—Bruce Y. Arnold
Assistant Examiner—Martin Lerner
Attorney, Agent, or Firm—Bell, Seltzer, Park & Gibson

[57] ABSTRACT

A submarine periscope system has a mast head 7 with a casing 10 from which protrudes a shaft 16 carrying observation instruments which are protected by a housing 8. A seal arrangement 30 is provided at the interface between the casing 10 and shaft 16 which imposes low friction torque at water pressures within the operational depth range of the periscope system and permits the shaft 16 to rotate for azimuthal movement of the observation instruments. A rotary drive 14 is connected to the shaft 16 for this purpose. The seal arrangement 30 imposes high friction torque at water pressures outside the operational depth range of the periscope system and a water depth pressure valve disables the shaft rotary drive to provide integrity of the seal arrangement outside the operational depth range. The mast head 7 is telescopically extendable by a hoist device 13 and does not penetrate the hull 2 of the submarine 3.

3 Claims, 2 Drawing Sheets

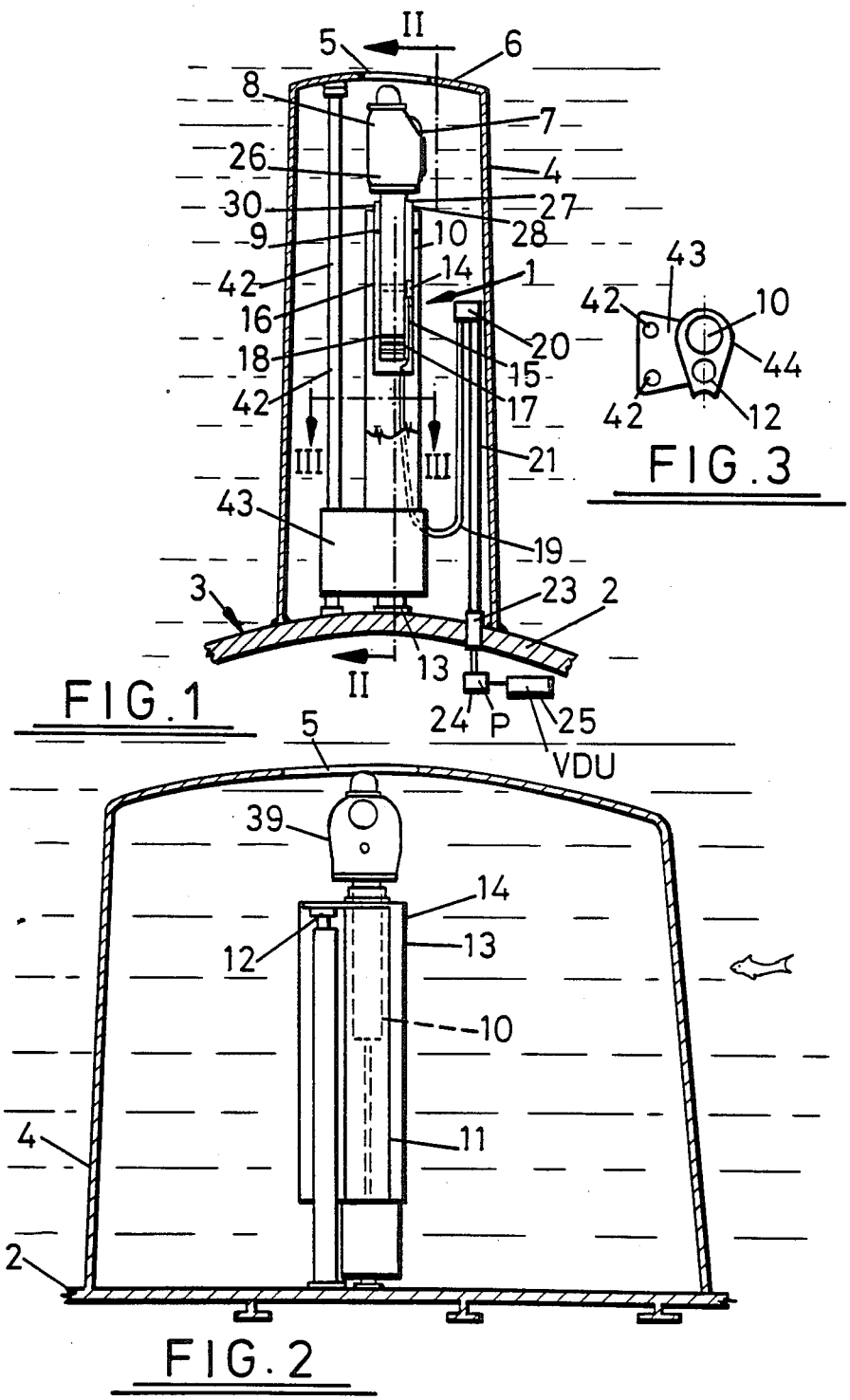

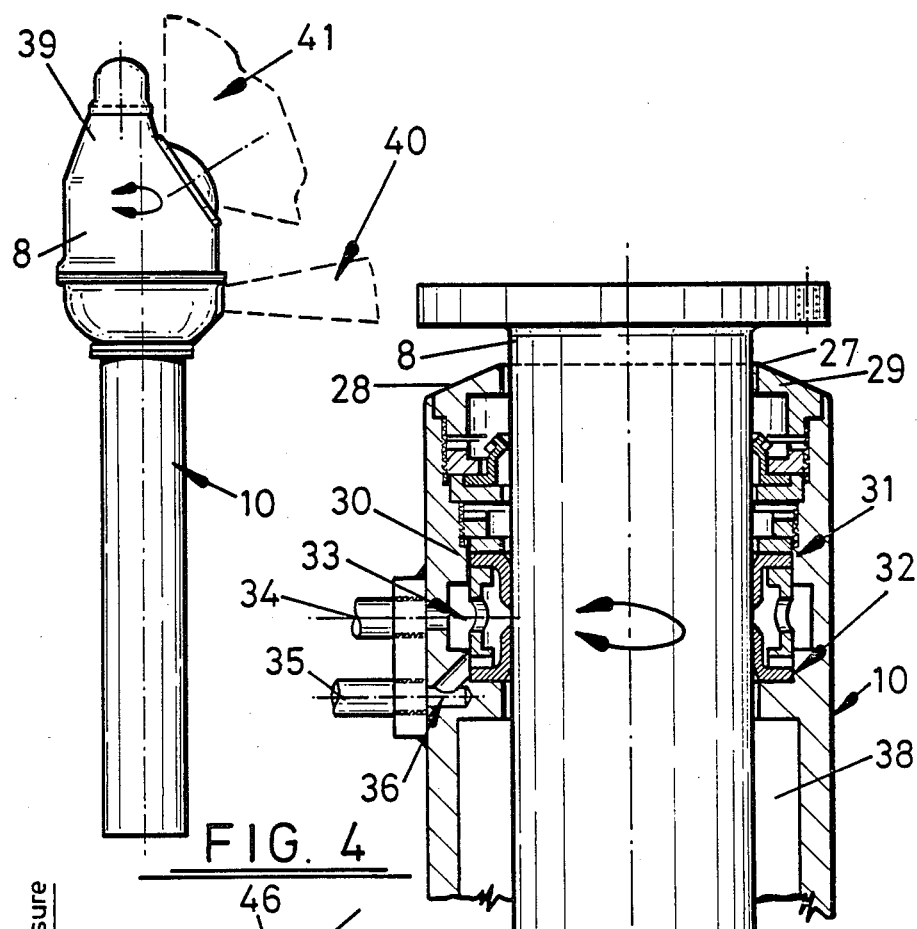
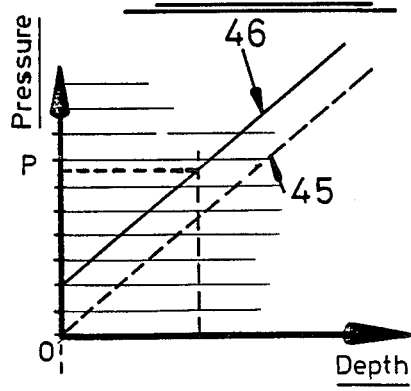
FIG. 4
FIG. 5
FIG. 6

SUBMARINE PERISCOPE SYSTEMS

This invention relates to submarine periscope systems.

Submarine periscope masts are well known and are fitted to submarines primarily for the purpose of permitting various observations including diverse sensor measurements to be taken above the water level during such times as the submarine is submerged close below the water level and is subjected to water pressure in the range O atmosphere to X atmosphere (where X is a design factor for the submarine) whilst only the uppermost portion or head of the mast projects above the water level.

In conventional periscope systems there is provided a complete full length sealed outer casing housing at its distal end various observation and sensor instruments and possibly also communications equipment, which are mounted at the distal end of a sealed rotatable mast in which are enclosed the sensitive electrical and optical components of the instruments and equipment. A simple gland seal is provided between the main hull and the casing to prevent water ingress therebetween whilst permitting extension and retraction of the mast. If any water does pass the gland it can be readily removed without any danger of penetrating to the mast interior. Since the full length of the periscope mast penetrates through two or more decks due to the unitary form of construction employed and to protect the integrity of its internal environment, it occupies a relatively large amount of the limited interior space of the submarine.

It has now been found that substantial improvements in operating efficiency and/or space utilization can be attained by dispensing with the major part of the mast and using a sealed sensor pod for observation and sensor measurements, which pod is connected by flexible cable means to a remote signal output means.

The present invention provides a submarine periscope for a submarine, which periscope comprises a periscope head comprising a casing having mounted therein a lower end portion of a sensor apparatus, an upper end portion of said sensor apparatus projecting outwardly from an opening in said casing, which opening is provided with a rotary seal means, and said upper end portion having a sensor pod means housing sensor means, said lower end portion of said sensor apparatus having a signal transmission device, said casing mounting a rotary sensor signal transmission connector means for receiving output signals from said signal transmission device, a flexible cable means extending from said connector through the casing wall, via an opening provided with a fixed seal means, for connection, in use of the system, to output signal receiving means mounted inside the main hull of a said submarine, said periscope head being provided with rotary drive means formed and arranged for rotating said sensor apparatus relative to said casing, and said rotary seal means being formed and arranged for providing a low pressure seal preventing ingress of water at a lower water pressure within a range corresponding to the periscope operating depth range whilst permitting said relative rotation of the sensor apparatus, and for providing a high pressure seal preventing ingress of water at higher water pressures outside the periscope operating range.

Preferably the periscope includes a hoisting means disposable in use outside the main watertight body of a submarine hull for raising and lowering the casing together with the sensor apparatus relative to the hull.

With a periscope of the present invention a number of problems associated with the use of a large unitary mast penetrating the main hull of a submarine are avoided. On the one hand the major bulk of the mast is dispensed with avoiding the need for providing any accommodation therefor within the hull thereby leaving additional space for other uses. On the other hand the mass and inertia are substantially reduced resulting in more rapid deployment and operation thereof.

Further preferred features and advantages of the invention will appear from the following detailed description given by way of example of a preferred embodiment illustrated with reference to the accompanying drawing in which:

FIG. 1 is a transverse, partially cut-away, general schematic vertical section of a periscope of the invention illustrating its mounting on a submarine;

FIG. 2 is a longitudinal vertical section of the periscope of FIG. 1;

FIG. 3 is a plan view of the principal parts only of the periscope of FIG. 1;

FIG. 4 is a side elevation of the sensor apparatus of the periscope of FIG. 1;

FIG. 5 is a detail view illustrating the rotary seal which is located at the interface between the sensor apparatus and the casing of the periscope of FIG. 1; and FIG. 6 illustrates pressure waveforms useful in understanding operation of the rotary seal of FIG. 1.

FIG. 1 shows a periscope mast 1 mounted on the hull 2 of a submarine 3 inside a fin housing 4 which has an opening 5 in its upper end 6 through which the upper end 7 of the periscope mast 1 is extendable for observation purposes.

In more detail, the mast head 7 has a sealed sensor apparatus 8 rotatably supported 9 by an elongate tubular casing 10 mounted in a tubular body 11 supported from the telescopically extendable ram 12 (see FIG. 2) of a hoisting device 13 which is mounted on the hull 2. The arm 10 mounts a drive motor 14, conveniently electrically operated, provided with a power supply cable 15 and arranged for rotation of the sensor apparatus 8.

The sensor apparatus 8 has a lower end portion 16 provided with an output signal transmission device 17 including suitable connection means 18 as required such as slip rings for electrical signal transmission and Sivers (Trade Name) joint means for microwave signal transmission, as well as service connections such as high pressure air flow to a sensor cooling means. The connection means 18 are in turn connected via a flexible cable means 19, a junction box 20 mounted inside the fin 4, and further cable means 21 extending through a hull opening 22 provided with a fixed seal 23 to a suitable signal processing means 24 and display means 25.

An upper end portion 26 of the sensor apparatus 8 projects outwardly of the casing 10 via an opening 27 in the top 28 of the casing 10, at which opening 27 is provided a collar 29 for minimizing debris penetration and a rotary seal 30 according to the present invention (see FIG. 5). In more detail the rotary seal 30 comprises upper and lower annular lip seals 31, 32, which engage the sensor apparatus lower end portion 16 and overly an annular cavity 33 formed in the casing 10.

Means for biassing the lip seals 31, 32, against the portion 16 is provided in the form of a high pressure air line 34 connected to the cavity 33 which delivers pressurized air to the cavity 33, and a return line 35 also connected to the cavity 33 via a water gathering reservoir 36 whereby any leakage water traversing the upper lip seal 31 and trapped by the lower lip seal 32 is removed at least periodically without de-pressurising the air system of the submarine to which the lines 34, 35 are connected. In this way the chamber 38 beneath the rotary seal 30 is maintained free of water so that the signal transmission connection means 18 etc are kept dry at all times and there is no moisture available to pass along the hollow interior of the portion 16 to the lower end portion or interior of the sensor apparatus 8 and the sensor means therein. Additional drying means using, for example, forced ventilation and/or desiccant means may be provided at or below said cavity 33 further to protect the sensitive optical and/or electronic systems.

The upper end portion 26 of the sensor apparatus 8 terminates in a sensor pod 39 containing optical and/or electronic observation instruments, each instrument having its own respective elevational field of view. By way of example field-of-view 40 is for T.V. observation: field-of-view 41 is for thermal imaging.

The hoisting device 12 is of generally known type with a telescopic hydraulically operated ram and vertically extending guide columns 42 are provided further to support and guide the periscope mast 1 through engagement with a base member 43 thereof as the mast 1 is raised and lowered by the hoisting device 12. The casing 10 and hoisting device 12 are substantially enclosed by a partly streamlined fairing 44.

FIG. 6 illustrates the water pressure 45 which prevails at the shaft/casing interface as the submarine depth increases, this pressure being linearly related to depth and curve 46 denotes the preferred air pressure applied to the cavity 33. It will be seen that the air pressure is in excess of the prevailing water pressure by a constant amount. This may be achieved by regulating the submarine high pressure air supply with a water depth pressure bellows valve. Additionally at a predetermined water pressure level P a pressure operated transducer is arranged to disable the shaft rotation motor to prevent shaft rotation. In this way sensor apparatus 8 rotation is permitted at shallow depths where observation is practical and friction torque imposed on the lower portion 16 by the seals 31, 32, is low but is not permitted where observation is impractical and where friction torque imposed on the lower portion 16 by the seals 31, 32, is high.

In use of the periscope mast at operational depths, the sensor pod 8 is raised by means of the hoist device 13 and can be freely rotated without restriction in either direction. As may be seen from the drawing the mass of both the telescopically extendable and rotating parts are considerably reduced as compared with conventional masts thereby facilitating a more rapid response and also having considerably lower drive and power relating requirements. In this connection it will also be appreciated that in a conventional periscope system extension and retraction requires significant frictional forces between the periscope mast and hull glands seals to be overcome whilst in the case of the present invention this frictional resistance is avoided.

Yet another advantage is the avoidance of water being positively drawn into the hull interior as occurs in conventional systems when the periscope mast is drawn back into the hull interior from the wet external environment. On the contrary since only the cables penetrate the hull and these can be provided with static fixed seals, moisture penetration to the hull interior associated with the periscope system can be substantially eliminated.

According to another aspect of the present invention there is provided a submarine periscope mast comprising a mast head having an outer casing from which protrudes a shaft carrying at its end a housing containing observation instruments and a sealing arrangement for use in a submarine periscope system at the interface between a casing and a sensor apparatus projecting therefrom and rotatable relative thereto, for sealing said interface against ingress of water at all water pressures within the design limit of the submarine and which imposes sufficiently low friction torque at water pressures within a predetermined range to permit the shaft to rotate within the casing, said sealing arrangement comprising upper and lower annular lip seals engaging the shaft and overlying an annular cavity formed in the casing, means for biassing the lip seals against the shaft with a pressure greater than the prevailing water pressure within said range, and means for collecting and removing leakage water from said annular cavity.

What is claimed is:

1. A submarine periscope mast for use in a submarine periscope system, comprising a mast head having an outer casing from which protrudes a rotatable shaft carrying at one end a housing containing observation instruments, and a sealing arrangement at an interface between the casing and the shaft for sealing said interface against ingress of water at all water pressures within the design limit of the submarine and which imposes sufficiently low friction torque at water pressures within a predetermined range to permit the shaft to rotate within the casing, said sealing arrangement comprising upper and lower annular lip seals engaging the shaft and overlying an annular cavity formed in the casing, means for biassing the lip seals against the shaft with a pressure greater than the prevailing water pressure within said range, and means for collecting and removing leakage water from said annular cavity.

2. A submarine periscope as claimed in claim 1, wherein said rotary drive means is disabled by a water depth pressure valve outside the periscope operating depth range.

3. A submarine periscope system comprising a casing located exteriorly of the submarine hull and having rotatably mounted therein a lower end portion of a sensor apparatus, an upper end portion of said sensor apparatus projecting outwardly from an opening in said casing and having electro-optic sensor means with a field of view for collecting visual-image-forming data, said opening being provided with a rotary seal means for providing a low pressure seal preventing ingress of water at a lower water pressure within a range corresponding to the periscope operating depth range whilst permitting relative rotation of the sensor apparatus, and for providing a high pressure seal preventing ingress of water at higher water pressures outsides the periscope operating range, rotary drive means for rotating said sensor apparatus relative to said casing, and hoisting means located outside the submarine hull for raising and lowering the casing together with the sensor apparatus relative to the hull, wherein said lower end portion of said sensor apparatus includes a signal transmission device, said casing includes a rotary signal transmission connector means for receiving signals from said signal transmission device, and a flexible cable means extends from said connector means through the wall of the casing, via an opening provided with a fixed seal means and is connected to signal receiving means mounted inside the submarine hull.

* * * * *